June 6, 1967 G. H. PERRY ET AL 3,324,312

MAGNETIC STORES PREVENTING SPURIOUS TRIGGERING OF TRANSISTOR

Filed May 22, 1964 3 Sheets-Sheet 1

Inventors
Gerald Horace Perry
Eric William Shallow
By Cushman, Darby & Cushman
Attorneys

*Inventors*
Gerald Horace Perry
Eric William Shallow
By Cushman, Darby & Cushman
ATTORNEYS

*Inventors*
Gerald Horace Perry
Eric William Shallow
By Cushman, Darby & Cushman
ATTORNEYS United States Patent Office 3,324,312

Patented June 6, 1967

3,324,312

MAGNETIC STORES PREVENTING SPURIOUS TRIGGERING OF TRANSISTOR

Gerald Horace Perry and Eric William Shallow, Malvern, England, assignors to National Research Development Corporation, London, England, a British corporation Filed May 22, 1964, Ser. No. 369,544
Claims priority, application Great Britain, May 22, 1963, 20,394/63
2 Claims. (Cl. 307—88.5)

This invention relates to magnetic stores of the kind in which a magnetic circuit is provided having a magnetic characteristic of the type generally called a rectangular hysteresis-loop characteristic; such a magnetic circuit possesses two clearly defined states of remanent magnetisation flux which are distinguishable by the direction of the flux; the direction of the flux is determined by the direction of the magnetising field which produced it. The store is changed from one state to the other by applying a magnetising field of a suitable level and of a direction opposite to that of the field which established the existing state; the application of a magnetising field having the same direction as that of the establishing field has only a small effect.

A typical magnetic circuit is in the form of a ring core made from ferrite or other magnetic material which possesses the desired rectangular hysteresis loop characteristics; the magnetising field can then be applied by means of coils wound on the ring core. For a given sense of the magnetising field (dependent upon the direction of winding of the coil and of the current flow in it) the core will change its magnetisation from one given state to another; to reverse the change the magnetising must be applied in the opposite sense.

For convenience in the field of activity in which such cores are used the two states are commonly designated "1" and "0" following conventional binary notation. Similarly a coil which, for a given direction of current will establish, or alternately not disturb , a "1" state in a core, can be designated a "1" coil; a "0" coil follows naturally as a coil arranged to magnetise the core in the opposite direction and which will establish, or will not disturb, a "0" state.

A core can usefully store information in a binary manner ("1" or "0", plus or minus, on or off, and so forth) and means can be provided for changing the state of the core and for interrogating the core to determine its state at a given time.

A simple basic store of the kind referred to comprises a magnetic circuit having a so-called rectangular hysteresis-loop characteristic, at least one coil linking the magnetic circuit, a semi-conductor switching device having an emitter, a collector and a base electrode, one coil and the switching device being connected so that a signal current flows in its collector circuit whenever the magnetisation of the magnetic circuit is changed in one sense.

An input signal can be applied to the magnetic store to determine its magnetisation state by using suitable convenient input means, such as a coil, or coils, linking with the magnetic circuit, or, simply by a suitable connection to the circuit of the coil connected with the switching device.

Conveniently the one coil and the switching device are connected with two terminals of the coil connected across the emitter and base of the device. Where the device is an "N" type transistor the emitter is connected positively relative to the collector; an output load resistor is connected in the emitter-collector circuit. In the absence in the coil of a pulse due to a change of direction of the remanent flux in the magnetic circuit the coil effectively shorts the transistor emitter-base circuit and negligible current flows in the transistor, i.e. it is turned-off, but when a pulse appears in the coil due to a change of direction of the flux in one given sense the base is biased negatively relative to the emitter; current then flows between the emitter and the collector and an output pulse signal appears across the emitter-collector load resistor. A pulse in the coil due to a change of direction of the flux in the opposite sense to the given sense merely biases the base more positively relative to the emitter and there is no increase of current in the emitter-collector circuit.

When a "P" type transistor is used appropriate changes of polarity are necessary but the principle of operation is the same.

Feedback means can advantageously be provided to feed back the signal current or part of it to produce flux in the magnetic circuit to assist the change of flux producing it (i.e. the flux due to the input pulse). Such means are typically a coil linking with the magnetic circuit and connected in an appropriate sense in the collector circuit of the switching device.

The effect of such feedback is that the signal current caused to flow in the collector circuit assists the already-initiated chang of flux in the magnetic circuit; thus a pulse of less amplitude and/or duration may be used to change the state of the store.

The simple basic store referred to is a versatile circuit having many applications, some of which are described in British patent application No. 844,850.

At the time when the basic store was developed germanium alloy junction transistors were in common use and it was then found that a small bias voltage between the base and the emitter of the transistor gave advantages in reducing quiescent collector current, making the store switching time less dependent on individual transistor characteristics and making the collector current duration approximate more closely to the switching time of the magnetic circuit.

More recently modern silicon planar epitaxial transistors have been introduced and have made it unnecessary to use any bias voltage in the base-emitter circuit of the transistor to obtain these advantages. The result has been a welcome simplification in circuit arrangement but with some greater susceptibility of the store to the effects of departure from the ideal shape of the hysteresis loop of the magnetic circuit. These effects are in the form of spurious pulses which may tend to turn on the transistor at the wrong time under the conditions (i) when the magnetic circuit, e.g. a ferrite core, is driven from remanence in the "0" state to saturation in the "0" state;
(ii) when the magnetic circuit relaxes from saturation in the "1" state to remanence in the "1" state.

It is accordingly an object of the invention to provide an improved store of the kind referred to which is less susceptible to effects due to imperfection of the hysteresis loop of the magnetic circuit.

According to the invention there is provided a digital store including a magnetic circuit having a so-called rectangular hysteresis loop characteristic, at least one coil linking the magnetic circuit, a semiconductor switching device having an emitter, a collector and a base electrode, one coil and the switching device being connected so that a signal current flows in its collector circuit whenever the magnetisation of the magnetic circuit is changed in one sense, input means for applying input signals to determine the state of the magnetic circuit and auxiliary magnetic circuit means providing coupling between the base circuit of the semiconductor switching device is inhibited when the magnetic circuit (i) is driven from remanence in one, the "0" state to saturation in that state, and, (ii)

relaxes from saturation in the other, the "1" state to remanence in that state.

In order to make the invention clearer an example of an improved store will now be described, reference being made to the accompanying drawings, in which:

FIG. 2 shows schematically a circuit of a store of the kind referred to;

FIG. 3 shows schematically a circuit of another store of the kind referred to;

Figure 2:
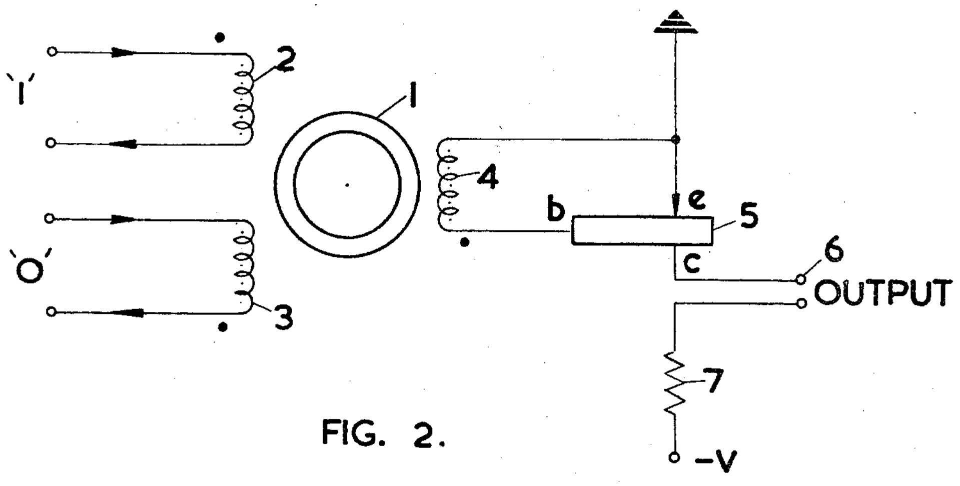

A conventional basic store is shown in FIG. 2 in which a ferrite core 1 of rectangular hysteresis loop material carries two input coils 2 and 3 for setting the core 1 in the "1" and the "0" states respectively, and a coil 4 which is connected to the base-emitter circuit of a transistor 5. Output terminals 6 are connected in the emitter-collector circuit of the transistor 5 in series with a load resistor 7.

Figure 3:
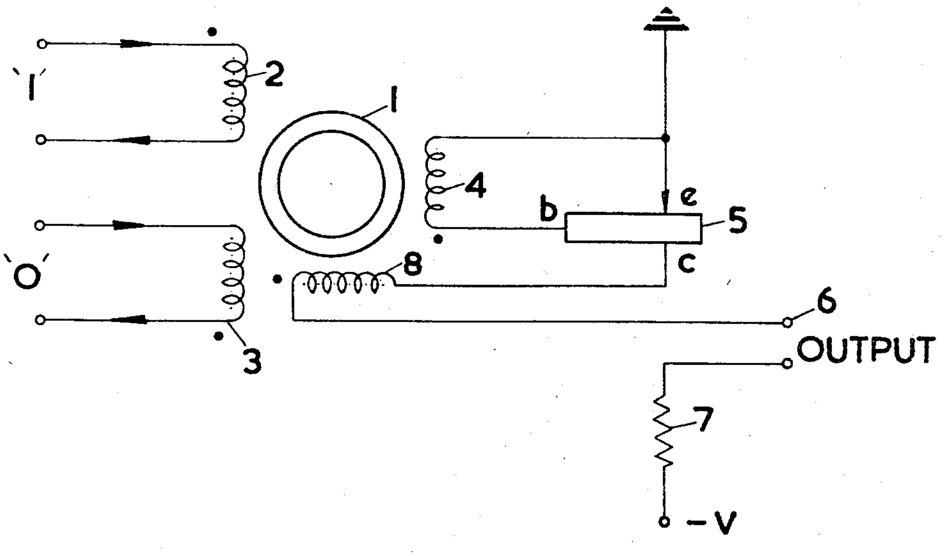

A similar circuit is shown in FIG. 3 in which a feedback coil 8 coupled to the core 1 is also provided in series with the collector of the transistor 5 and the output terminals 6.

Operation of similar circuits is referred to in detail in British patent specification No. 844,850 and will not be repeated here.

Figure 1:
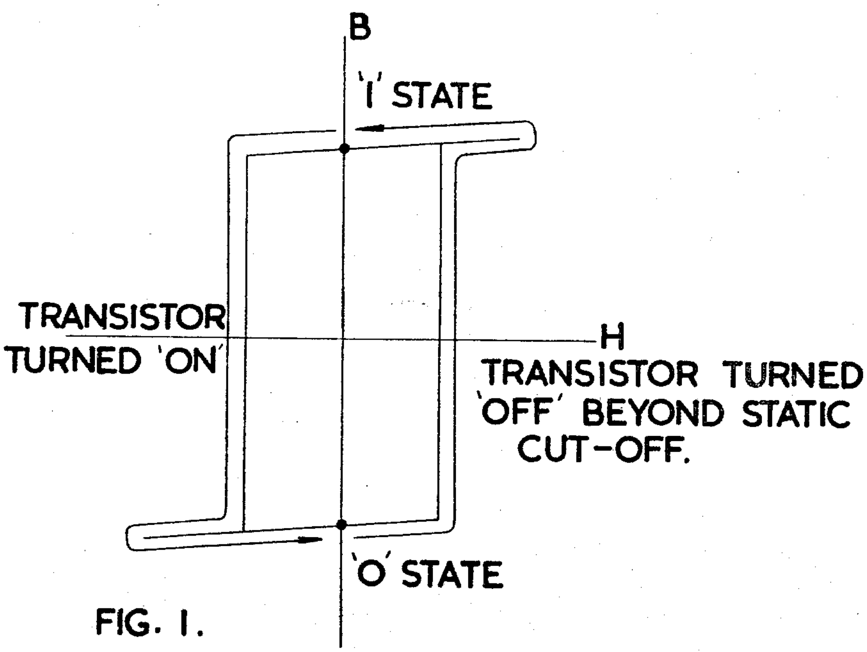
FIG. 1 shows an idealised rectangular hysteresis loop characteristic for a magnetic circuit.

The effects of departure from the ideal shape of the hysteresis loop characteristic of a magnetic circuit under the conditions:

(i) when the circuit is driven from remanence to saturation in the "0" state;

(ii) when the circuit relaxes from saturation to remanence in the "1" state;

may be understood from reference to FIG. 1 which shows that in each condition the small flux change occurring is in the direction that induces an emitter-base voltage of the polarity for switching on the transistor 5.

Normally the amplitude and duration of these voltages at room temperature is insufficient to bottom a transistor, but at temperatures greater than approximately 30° C. they are likely to bottom a transistor. This is especially so if regeneration, as shown for instance in FIG. 3 is used.

Figure 4:
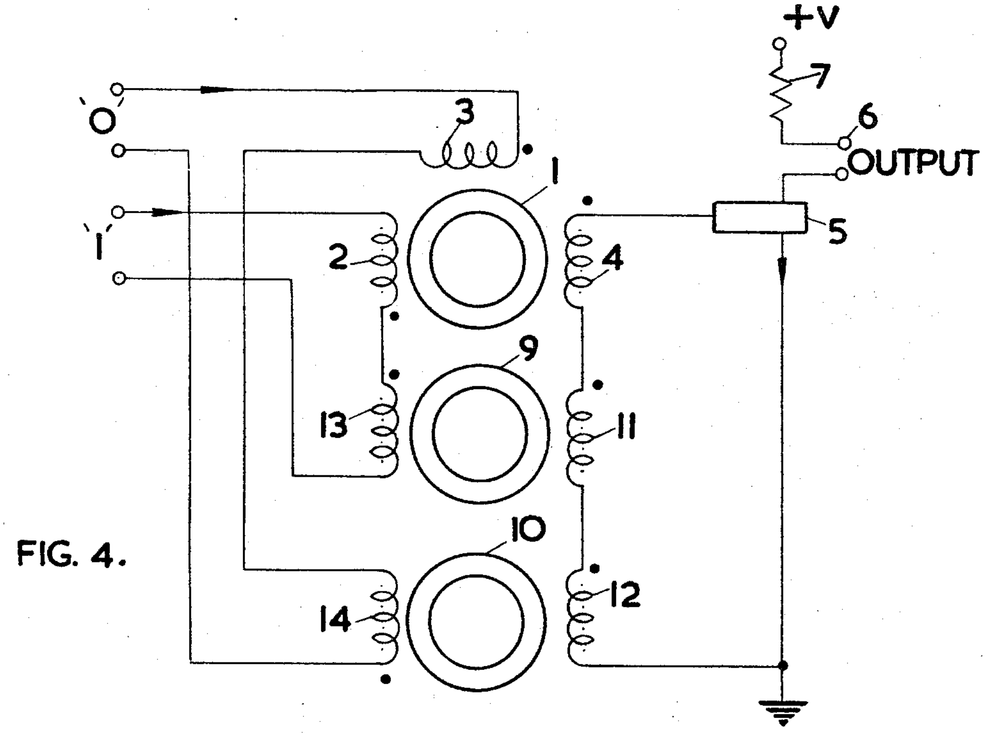
FIG. 4 shows schematically a circuit of an improved store according to the invention.

To overcome this problem the circuit arrangement of FIG. 4 is used. This arrangement is basically that of FIG. 2 with the addition of two cores 9, 10 having coils 11, 12 connected in series with and in the same sense as the coil 4 of the core 1, and coils 13, 14 respectively connected in series with the "1" coil 2 and the "0" coil 3 of the core 1 but in opposite sense to the coils 2 and 3.

In operation when the core 1 is driven according to condition (i) the current applied to the "0" terminals also induces a voltage in the coil 12 of core 10 opposite in phase and equal in amplitude to the voltage in the coil 4 of core 1. When the core 1 is driven according to condition (ii) a similar action takes place in coil 11 of core 9 and coil 4 of core 1 at the time when the current flow via the "1" terminals ceases. Thus the voltages induced in coil 4 of core 1 in either of conditions (i) or (ii) are cancelled by the voltages induced in coil 12 of core 10, and coil 11 of core 9 respectively.

Figure 5:
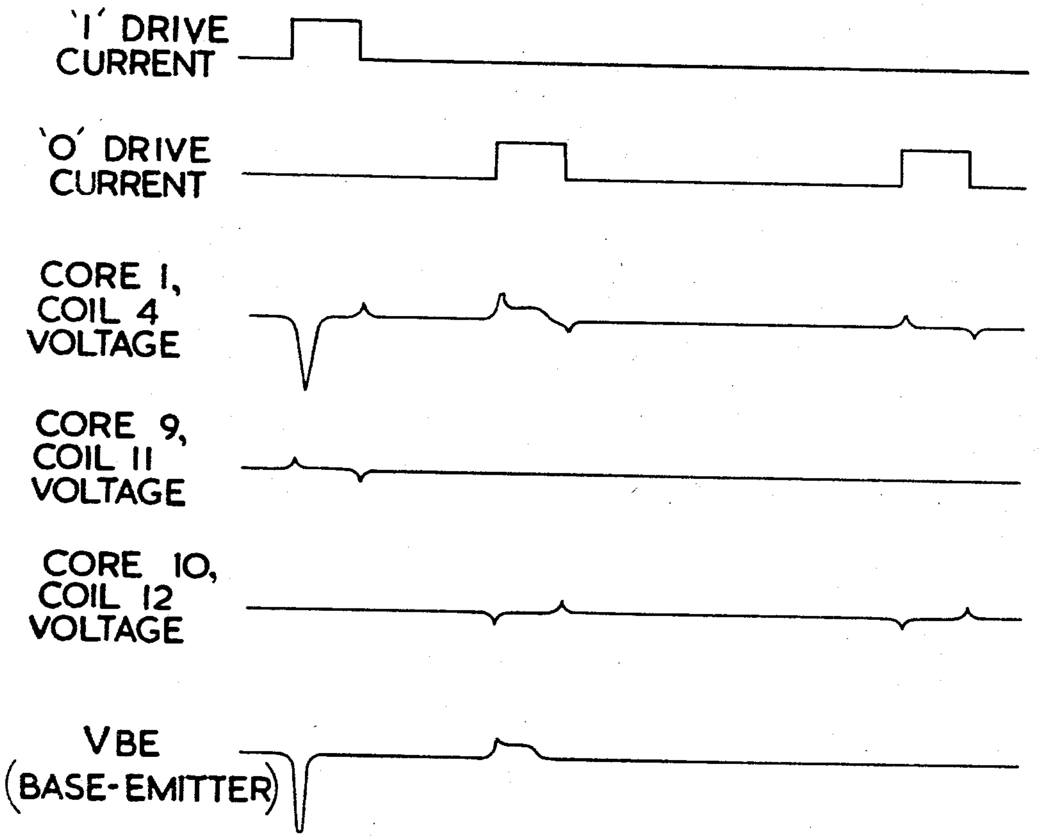
FIG. 5 shows waveform diagrams to assist understanding of the operation of the store of FIG. 4.

In operation under conditions of drive and of (i) and (ii), waveforms appearing at the secondary windings 4, 11 and 12 of the cores 1, 9, and 10 and the resultant $V_{BE}$ waveform when the "0" and "1" drive pulses are applied as shown in FIG. 5. The waveforms show that only those voltages due to flux changes in the core 1 from "0" remanence to "1" saturation, and "1" remanence to "0" saturation less the small voltages due to cores 9 and 10 are coupled to the transistor 5. It is assumed of course that there has been at least one "1" and one "0" pulse applied to the circuit so that the core 9 and the core 10 have assumed their correct states before the train of "1" and "0" pulse shown above arrives.

The number of turns used in the coils of the core 1 is calculated in the conventional manner. To enable the appropriate cancelling voltages to be obtained, both the core 9 and the core 10 are provided with the same number of secondary turns in the coils 11, 12 as the coil 4 of the core 1, while the primary coil 13 of the core 9 is wound with the same number of turns as the "1" coil 2 of the core 1 and the core 10 primary coil 14 is wound with the same number of turns as the "0" coil 3 of the core 1. To minimise inductive and delay effects, the three cores 1, 9, 10 are mounted close together on a common header. Temperature differences between cores are thereby also reduced to a minimum.

Summing up we may say that using modern silicon planar epitaxial transistors circuitry is simplified since bias is no longer necessary. However, under these conditions, the lack of rectangularity of magnetic core hysteresis loops may produce pulses capable of bottoming a transistor.

This is because the modern transistors produce pulses having fast (30–20 nS) edges, and although the difference in remanent and saturation flux in the core 1 may be small, since the time $t$ is very short, the rate of change of flux, $d\phi/dt$ is high and this causes a large voltage to be generated for a short time. This may then turn on the transistor since the gain/bandwidth product of these transistors is so much greater than the alloy-type transistors. Also as ambient temperature is increased, amplitudes of unwanted pulses increase slightly thereby aggravating the trouble. In these circumstances the use of compensating cores allows the use of modern transistors producing fast edges with rectangular hysteresis loop memory cores over a wide range of temperatures.

We claim:

1. A digital data storing circuit including:

a first magnetic circuit having first and second remanence states corresponding to opposite directions of magnetic flux in said first magnetic circuit, a semiconductor switching device having an emitter, a collector and a base electrode, a first coil linking said first magnetic circuit, a second coil linking said first magnetic circuit and connected in the base circuit of said semiconductor switching device, a second magnetic circuit having at least one remanence state, a third coil linking said second magnetic circuit and connected in series with said first coil in such a sense as to leave undisturbed the state of remanence of said second magnetic circuit when said first coil is energized, and a fourth coil linking said second magnetic circuit and connected in series with said second coil in such a sense as to oppose a voltage induced in said second coil by the energization of said first coil.

2. A digital data storing circuit as claimed in claim 1 and in which the magnetic circuit includes a toroidal magnetic core.

References Cited

UNITED STATES PATENTS 2,991,457 7/1961 Hoffman et al. ------ 307—88.5

ARTHUR GAUSS, *Primary Examiner.*

B. P. DAVIS, *Assistant Examiner.*